(12) United States Patent
Ceder et al.

(10) Patent No.: US 10,903,494 B2
(45) Date of Patent: Jan. 26, 2021

(54) SODIUM BATTERY ELECTRODE COMPOSITIONS

(71) Applicant: The Regents of the University of California, Oakland, CA (US)

(72) Inventors: Gerbrand Ceder, Orinda, CA (US); Haegyeom Kim, Emeryville, CA (US)

(73) Assignee: The Regents of the University of California, Oakland, CA (US)

( * ) Notice: Subject to any disclaimer, the term of this patent is extended or adjusted under 35 U.S.C. 154(b) by 14 days.

(21) Appl. No.: 16/380,286

(22) Filed: Apr. 10, 2019

(65) Prior Publication Data

US 2020/0328421 A1 Oct. 15, 2020

(51) Int. Cl.
*H01M 4/02* (2006.01)
*H01M 4/58* (2010.01)
*H01M 10/054* (2010.01)

(52) U.S. Cl.
CPC ....... *H01M 4/5825* (2013.01); *H01M 10/054* (2013.01); *H01M 2004/028* (2013.01)

(58) Field of Classification Search
CPC ...................................................... H01M 4/02
See application file for complete search history.

(56) References Cited

U.S. PATENT DOCUMENTS

2019/0273257 A1* 9/2019 Siu ......................... H01M 4/623

* cited by examiner

*Primary Examiner* — Jacob B Marks
(74) *Attorney, Agent, or Firm* — Gavrilovich, Dodd & Lindsey LLP

(57) ABSTRACT

A sodium-ion battery includes an electrode having a crystalline active material represented by formula units that intercalate and/or deintercalate charge carriers during operation of the battery. In some instances, the active material that experiences a volume change of less than 6.0%, 4.0%, or even 2.0% when the active material intercalates charge carriers during operation of the battery.

23 Claims, 12 Drawing Sheets

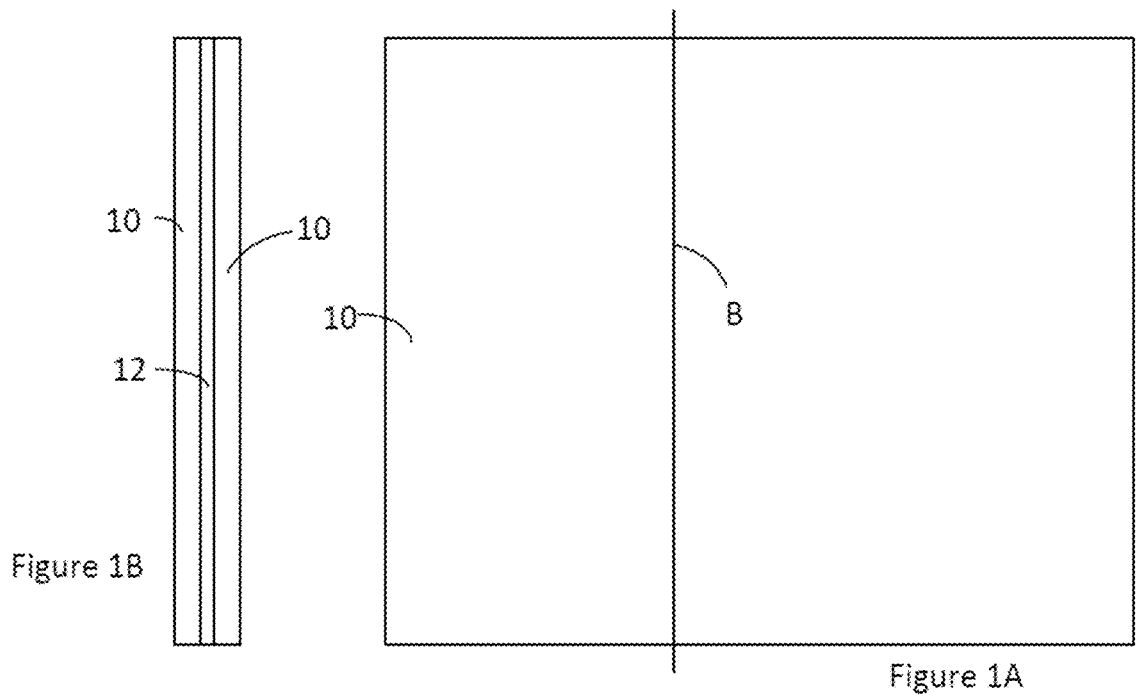
Figure 1A
Figure 1B
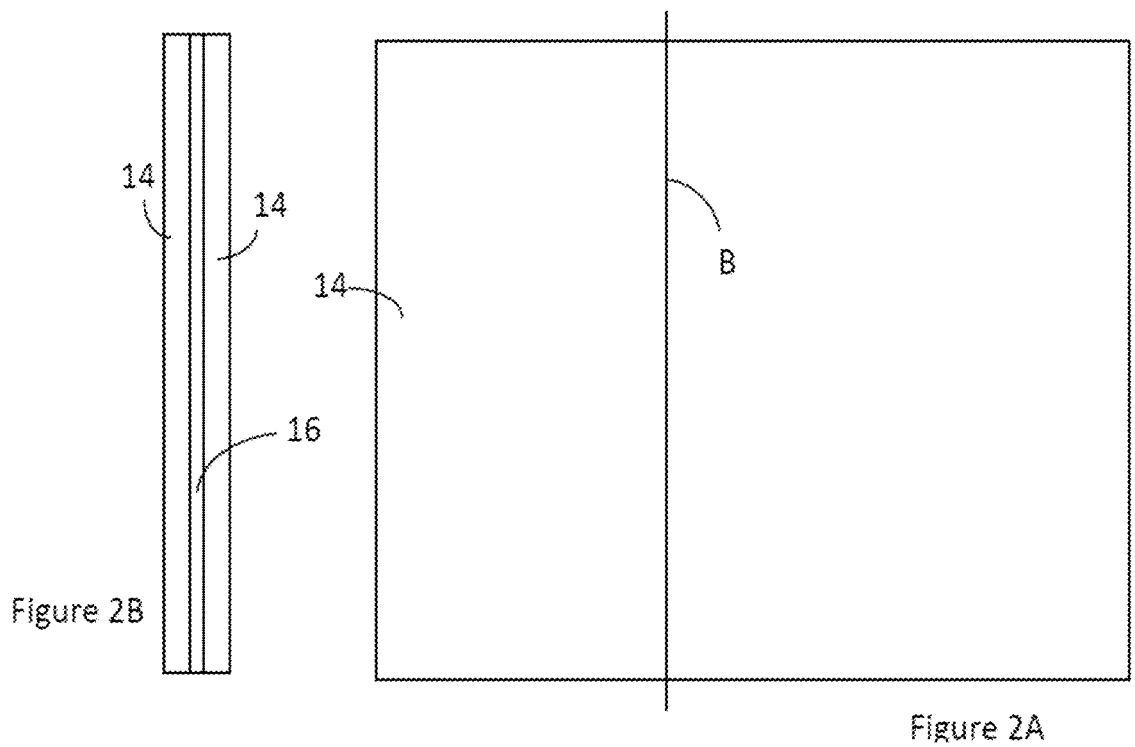
Figure 2A
Figure 2B

KVPO$_4$F
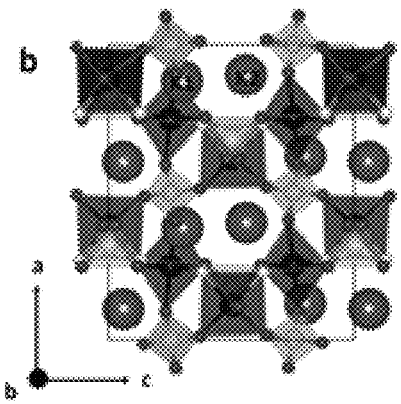
FIG. 12A          FIG. 12B
NaVPO$_4$F
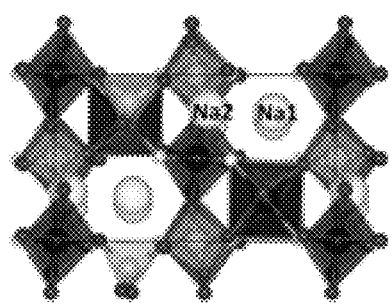
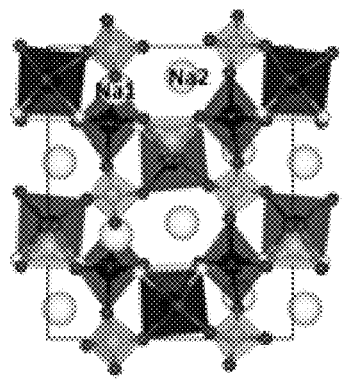
FIG. 12C          FIG. 12D
LiVPO$_4$F
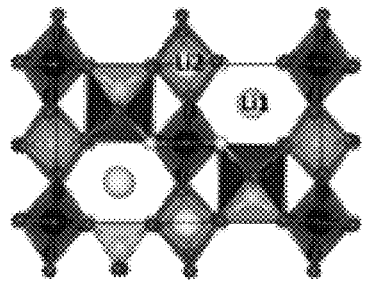
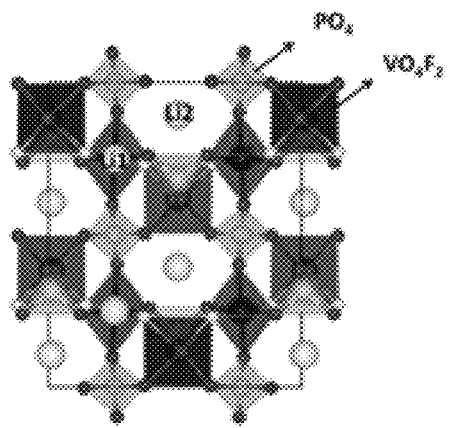
FIG. 12E          FIG. 12F

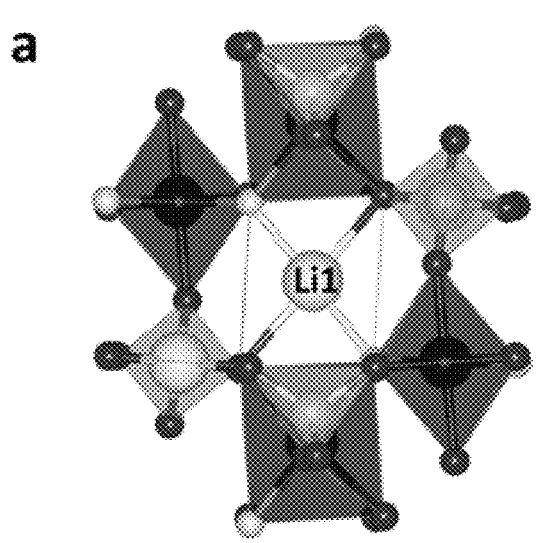
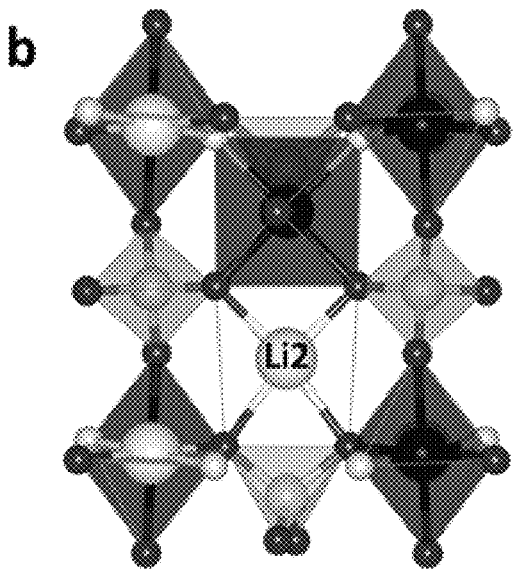
FIG. 13A  FIG. 13B
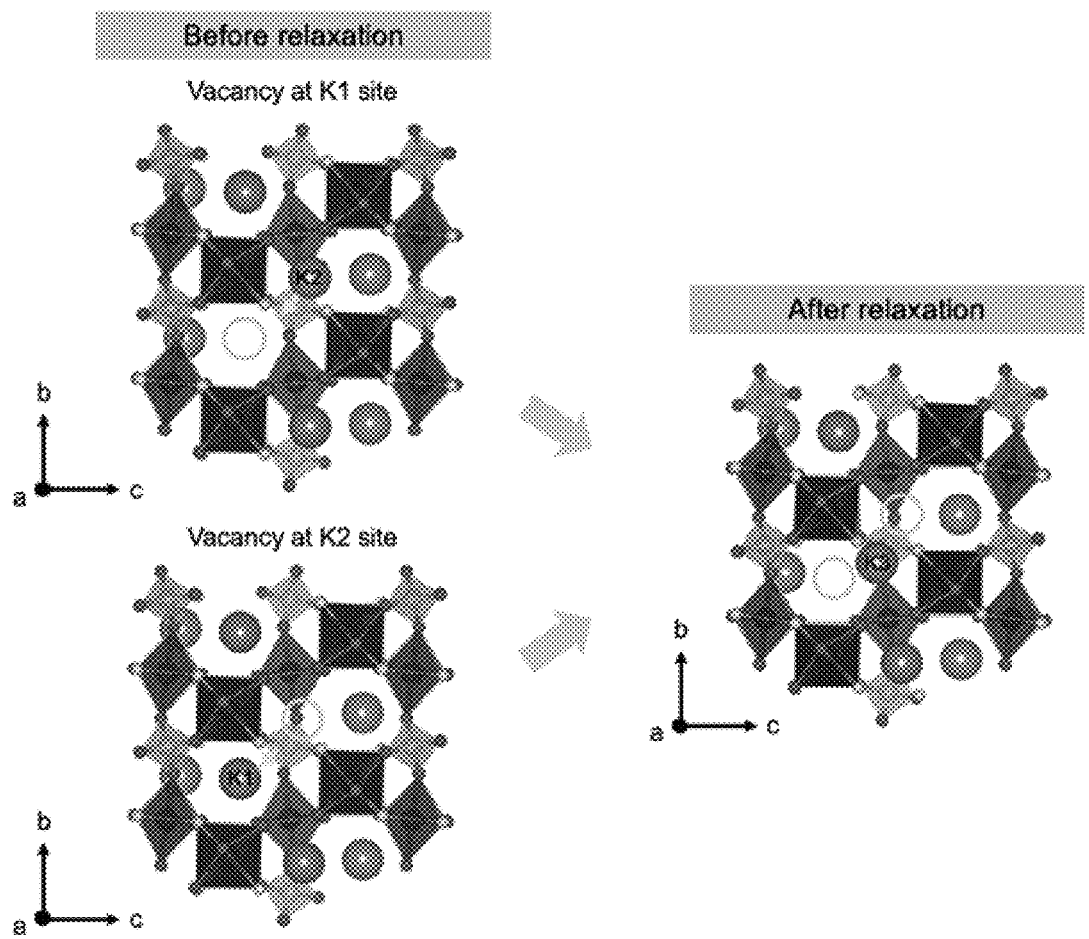
FIG. 14

Hexagonal void 1

Hexagonal void 2

SODIUM BATTERY ELECTRODE COMPOSITIONS

FIELD

The invention relates to batteries and more particularly to alternatives to lithium ion batteries.

BACKGROUND

Lithium-ion batteries have become a leading technology for energy storage in portable and automotive applications. Other battery technologies have also been developed as alternatives to lithium-ion batteries. Sodium-ion batteries are an example of an alternative that uses sodium ions as charge carriers rather than lithium ions. Since sodium is more abundant than lithium, these batteries may be cheaper to produce than lithium-ion batteries. However, the adoption of sodium-ion batteries has been limited by an undesirably low gravimetric capacity and/or gravimetric energy density. As a result, there is a need for improved alternatives to lithium-ion batteries.

SUMMARY

The disclosure provides a sodium-ion battery, comprising an electrode having a sodium intercalating crystalline active $KTiOPO_4$-type compound. In one embodiment, the sodium intercalating crystalline active $KTiOPO_4$-type compound has an orthorhombic crystal structure. In yet another or further embodiment, the sodium intercalating crystalline active $KTiOPO_4$-type compound has octahedral V(III) sites. In yet another or further embodiment, the sodium intercalating crystalline active $KTiOPO_4$-type compound has vanadium in sites that are octahedrally coordinated by oxygen. In still another or further embodiment, the sodium intercalating crystalline active $KTiOPO_4$-type compound has tetrahedral phosphate sites. In another or further embodiment, the sodium intercalating crystalline active $KTiOPO_4$-type compound comprises a sodium having a coordination number of 8. In yet another or further embodiment, the sodium intercalating crystalline active $KTiOPO_4$-type compound comprises a sodium linked to other atoms through an oxygen intermediate. In another embodiment, the electrode comprises $NaVPO_4F$. In another embodiment, the electrode is a positive electrode or a cathode. In a further embodiment, the sodium intercalating crystalline active $KTiOPO_4$-type compound comprises multiple octahedral structures that share a common atom, and the formula units each includes multiple screening ions. In yet a further embodiment, at least one of the screening ions is an oxygen anion ($O^{2-}$). In still a further embodiment, each of the screening ions is an oxygen anion. In another embodiment, the positive electrode or cathode exhibits a capacity of 122 mAh $g^{-1}$ for a first charge and 106 mAh $g^{-1}$ for a first discharge. In still another or further embodiment, the positive electrode or cathode has a voltage of about 3.8 to 4.1. In another embodiment, the electrode or cathode has an average voltage of ~3.98 V.

The disclosure also provides a sodium-ion battery or sodium metal battery, comprising (a) an anode having an anode active material; (b) a cathode having a sodium intercalating crystalline active $KTiOPO_4$-type compound; and (c) a separator disposed between said anode and said cathode. In one embodiment, the sodium intercalating crystalline active $KTiOPO_4$-type compound has an orthorhombic crystal structure. In yet another or further embodiment, the sodium intercalating crystalline active $KTiOPO_4$-type compound has octahedral V(III) sites. In yet another or further embodiment, the sodium intercalating crystalline active $KTiOPO_4$-type compound has vanadium in sites that are octahedrally coordinated by oxygen. In still another or further embodiment, the sodium intercalating crystalline active $KTiOPO_4$-type compound has tetrahedral phosphate sites. In another or further embodiment, the sodium intercalating crystalline active $KTiOPO_4$-type compound comprises a sodium having a coordination number of 8. In yet another or further embodiment, the sodium intercalating crystalline active $KTiOPO_4$-type compound comprises a sodium linked to other atoms through an oxygen intermediate. In another embodiment, the cathode active material comprises $NaVPO_4F$. In yet another embodiment, the positive electrode or cathode exhibits a capacity of 122 mAh $g^{-1}$ for a first charge and 106 mAh $g^{-1}$ for a first discharge. In still another or further embodiment, the positive electrode or cathode has a voltage of about 3.8 to 4.1 V. In another embodiment, the positive electrode or cathode has an average voltage of ~3.98 V.

The disclosure also provides a system, comprising a sodium-ion battery as described above and herein; and electronics for controlling the discharge of the battery.

BRIEF DESCRIPTION OF THE FIGURES

FIG. 1A and FIG. 1B illustrate a negative electrode of a battery. FIG. 1A is a side view of the negative electrode.

FIG. 1B is a cross section of the negative electrode taken along the line labeled B in FIG. 1A.

FIG. 2A and FIG. 2B illustrate a positive electrode. FIG. 2A is a sideview of the positive electrode.

FIG. 2B is a cross section of the positive electrode taken along the line labeled B in FIG. 2A.

FIG. 12A-F shows calculated structures of (A-B) KVPO$_4$F, (C-D) NaVPO$_4$F, and (E-F) LiVPO$_4$F.

FIG. 13A-B shows (A) Li1 and (B) Li2 site coordinations in calculated LiVPO$_4$F structure.

FIG. 14 shows K-ion migration to K3 site during DFT structural relaxation. The K ion adjacent to a vacancy spontaneously moves to a K3 site.

DESCRIPTION

Figure 3:
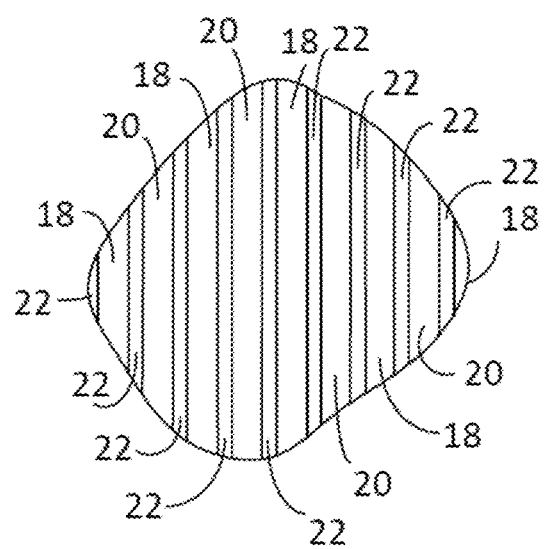
FIG. 3 is a cross section of a portion of an electrode assembly that includes negative electrodes constructed according to FIG. 1A through FIG. 1B and positive electrodes constructed according to FIG. 2A through FIG. 2B.

As used herein and in the appended claims, the singular forms "a," "an," and "the" include plural referents unless the context clearly dictates otherwise. Thus, for example, reference to "a sodium ion" includes a plurality of sodium ions and reference to "the electrode material" includes reference to one or more electrode materials and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. With respect to any term that is presented in one or more publications that is similar to, or identical with, a term that has been expressly defined in this disclosure, the definition of the term as expressly provided in this disclosure will control in all respects.

A battery includes an electrode with an active medium into which charge carriers intercalate and/or from which the charge carriers deintercalate during operation of the battery. The active medium includes a crystalline active material represented by formula units that intercalate and/or deintercalate charge carriers during operation of the battery.

Rechargeable batteries, including Li-ion (LIBs), Na-ion (NIBs), and K-ion batteries (KIBs) have been studied as potential energy storage systems. Among these, KIBs are particularly interesting because graphite can intercalate K ions reversibly, making it a standard anode for KIBs, and because the standard redox potential of K/K$^+$ is lower than that of Na/Na$^+$ and even Li/Li$^+$ in non-aqueous electrolytes, translating into a potentially higher working voltage.

The disclosure demonstrates that VPO$_4$F cathodes can deliver reversible capacities of ~90-100 mAh g$^{-1}$ with high average voltages of ~4.3, ~3.98, and ~3.96 V in K, Na, and Li cells, respectively. The lowest voltage for Li, as compared to Na intercalation, was attributed to the large cavity size in the VPO$_4$F framework, which leads to undercoordination for Li ions. The VPO$_4$F cathode exhibits stable cycling and high rate capability in K, Na, and Li cells. However, Li insertion into VPO$_4$F is more difficult than Na and K despite its small ionic radius.

The disclosure demonstrates that the VPO$_4$F framework can function as a versatile cathode for sodium ions. The VPO$_4$F cathode delivers good cycling stability and a high discharge rate (see, e.g., FIGS. 6 and 7). The stable cycle life and high rate capability of the VPO$_4$F cathode likely result from the large cavity size for alkali ions, which can accommodate alkali-ion intercalation and enable fast alkali-ion migration. A NEB calculation reveals that NaVPO$_4$F has a migration barrier of 222 meV. The Na migration barrier is even lower than that for the NASICON-type Na$_3$V$_2$(PO$_4$)$_3$ cathode (353 meV), and the Li migration barrier in the VPO$_4$F cathode is comparable to that for tavorite LiVPO$_4$F (418 meV), a high-rate cathode. These results indicate the VPO$_4$F is a framework for fast alkali-ion intercalation. Interestingly, both experiments and NEB calculations show that the insertion of Li into VPO$_4$F is more difficult than Na and K. The higher Li migration barrier is attributable to the different site occupancy which leads to a different migration path and transition state where it is only coordinated by two anions. The disclosure demonstrates how different alkali ions can have different migration paths in the same host, and demonstrates that large alkali-ion migration channels are not always good for fast ion diffusion, something that has been earlier observed when comparing Na and Li migration in β-alumina. To achieve high-rate capability, one needs to design electrode materials in which void space and transition states are suitably tailored to each migrating ion species. In the Na cell, VPO$_4$F provides a high voltage of 3.98 V (vs. Na), which is the highest reported voltage in a vanadium-based polyanion cathode for NIBs, including Na$_3$V$_2$(PO$_4$)$_3$, Na$_3$V$_2$(PO$_4$)$_2$F$_3$, NaVPO$_4$F, and NaVOPO$_4$.

In some instances, the active material has at least two octahedral structures that each includes a screening ion. Additionally, the active material includes two or more charge carrier sites between the octahedral structures and around an axis that extends between the screening ions. An example active material has formula $VPO_4F$ in a $KTiOPO_4$-type crystal structure.

It has often been thought that large alkali-ion migration channels are good for fast ion diffusion, however, the disclosure demonstrates that this is not necessarily the case.

FIG. 1A and FIG. 1B illustrate a negative electrode for use in a battery. FIG. 1A is a sideview of the negative electrode. FIG. 1B is a cross section of the negative electrode taken along the line labeled B in FIG. 1A. The negative electrode includes a negative active medium 10 on both faces of a negative current collector 12. The negative active medium 10 includes or consists of one or more negative active materials. The negative current collector 12 is configured to provide an electrical pathway between the negative active medium 10 and the terminals of an electrochemical device. Although the negative active medium 10 is shown positioned on both faces of the negative current collector 12, the negative active medium 10 can be positioned on only one face of the negative current collector 12. As will be discussed below, in some instances, the negative electrode can include a carrier layer (not illustrated). The disclosed battery can be a primary or a secondary battery. As a result, the negative electrode can be an anode of a primary battery or a secondary battery.

Suitable negative current collectors 12 include, but are not limited to, Al, Cu, and steel. Suitable negative current collectors 12 include, but are not limited to, a foil, a net, a mesh, or a plate.

The negative active medium 10 can include or consist of one or more negative active materials. Suitable negative active materials include, but are not limited to, carbon, graphite, and sodium metal.

The negative medium can optionally include one or more components selected from the group consisting of one or more binders, one or more conductors and one or more diluents. Examples of suitable binders include, but are not limited to, polytetrafluoroethylene (PTFE), polyvinylidene fluoride (PVDF), and sodium polyacrylate. Examples of suitable conductors include, but are not limited to, carbon. Examples of suitable diluents include, but are not limited to, water and NMP. As will be discussed below, in some instances, the negative medium includes charge carrier in addition to the one or more active materials, any binders, any conductors and/or any diluents.

The negative electrode or anode can be generated by forming a slurry that includes the components of the negative medium and a solvent. The slurry is coated on one side the negative current collector 12 or on both sides of the negative current collector 12. The solvent can then be evaporated from the slurry so as to leave the negative medium on the current collector. The negative electrode can be cut out of the result.

In some instances, the negative electrode excludes the negative current collector 12. For instance, the negative medium can also serve as the negative current collector.

FIG. 2A and FIG. 2B illustrate a positive electrode. FIG. 2A is a sideview of the positive electrode. FIG. 2B is a cross section of the positive electrode taken along the line labeled B in FIG. 2A. The positive electrode includes a positive active medium 14 on both faces of a positive current collector 16. The positive active medium 14 includes one or more positive active materials. The positive current collector 16 provides an electrical pathway between the positive active medium 14 and a terminal of an electrochemical device. Although the positive active medium 14 is shown positioned on both faces of the positive current collector 16, the positive active medium 14 can be positioned on only one face of the positive current collector 16. The disclosed battery can be a primary or a secondary battery. As a result, the positive electrode can be the cathode of a primary battery or a secondary battery.

Suitable materials for the positive current collectors 16 include, but are not limited to, aluminum and steel. Suitable positive current collector 16 include, but are not limited to, a foil, net, mesh, or plate.

The positive active medium 14 includes, consists of, or consists essentially of one or more positive active materials. The positive active material can be a crystalline active material with formula units that intercalate and/or deintercalate charge carriers during operation of the battery. The positive active material can include octahedral structures that share a common atom. For instance, the octahedral structures can be arranged in bioctahedrons. In some instances, the octahedral structures share only one common atom. For instance, the octahedral structures can be arranged in bioctahedrons that share only a common vertex. In some instances, the octahedral structures are bridged by a tetrahedral structure such as $PO_4$. The formula units each include multiple screening ions. Each of the screening ions is included in one of the octahedral structures at a vertex opposite from the common atom included in the same octahedral structure. An axis extends between the screening ions included in a formula unit. More than two sodium charge carriers are located between the octahedral structures and around the axis. In some instances, the active material includes four charge carriers between the octahedral structures and around the axis.

Figure 18:
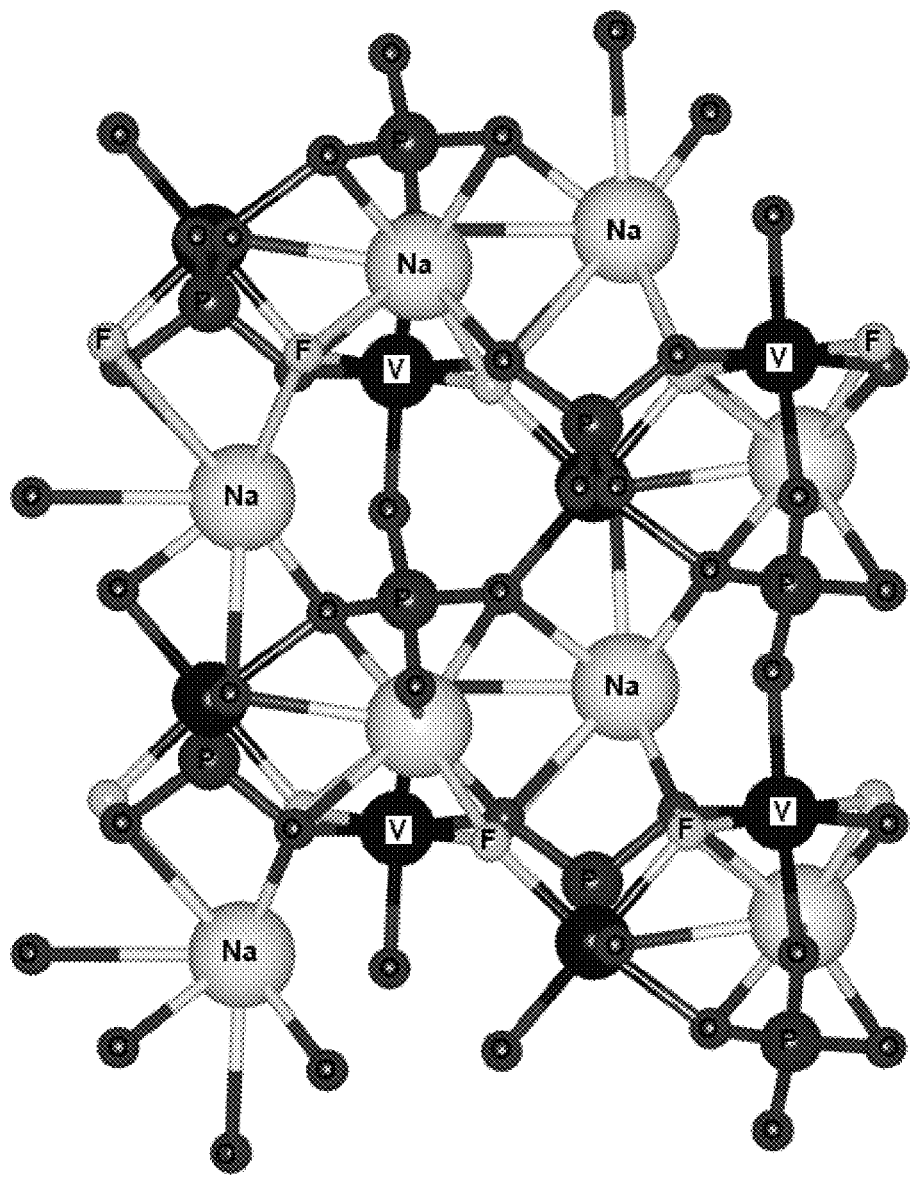
FIG. 18 is the crystal structure of NaVPO$_4$F.

An example of the positive active material has formula units represented by $NaVPO_4F$. In one embodiment, the positive active material comprises a $KTiOPO_4$-type crystal structure. In one embodiment, the positive active material has an orthorhombic crystal structure. In still another or further embodiment, the positive active material has octahedral V(III) sites. In still another or further embodiment, the positive active material has tetrahedral phosphate sites. In another embodiment, the sodium has a coordination number of 8. In still another or further embodiment, the sodium is linked to other atoms through an oxygen intermediate. In still another embodiment, a repeating unit of the positive active material has the structure as set forth in FIG. 18.

The positive active medium 14 can optionally include one or more components selected from the group consisting of one or more binders, one or more conductors and one or more diluents. Examples of suitable binders include, but are not limited to, polytetrafluoroethylene (PTFE), polyvinylidene fluoride (PVDF), hexafluoropropylene (HFP), styrene butadiene copolymers, and combinations of these binders. Examples of suitable conductors include, but are not limited to, carbon super P. In some instance, the positive electrode medium is 50 wt % to 95 wt % by weight of the positive active material.

The positive electrode can be generated by forming a slurry of $KVPO_4F$, coating the $KVPO_4F$ on the positive current collector to form an electrochemical cell. Extracting the potassium from the $KVPO_4F$ to provide a $VPO_4F$ and then discharge the $VPO_4F$ in a sodium cell. In this way, $NaVPO_4F$ with a $KTiOPO_4$-type structure is generated.

An electrode assembly includes one or more of the negative electrodes and one or more of the positive electrodes arranged in a stack or rolled together in a jellyroll configuration. When the electrode assembly includes multiple negative electrodes and multiple positive electrodes, the negative electrodes are alternated with positive electrodes. A separator is positioned between negative electrodes and positive electrodes that are adjacent to one another in the electrode assembly. For instance, FIG. 3 is a cross section of a portion of an electrode assembly. The electrode assembly includes negative electrodes 18 alternated with positive electrodes 20 and separators 22 positioned between the negative electrodes 18 and the positive electrodes 20 that are adjacent to each other.

Suitable separators for use in the electrode assembly include, but are not limited to, traditional separators such as Cellgard, glass fiber, polyolefins like polyethylene and polypropylene.

Figure 4:
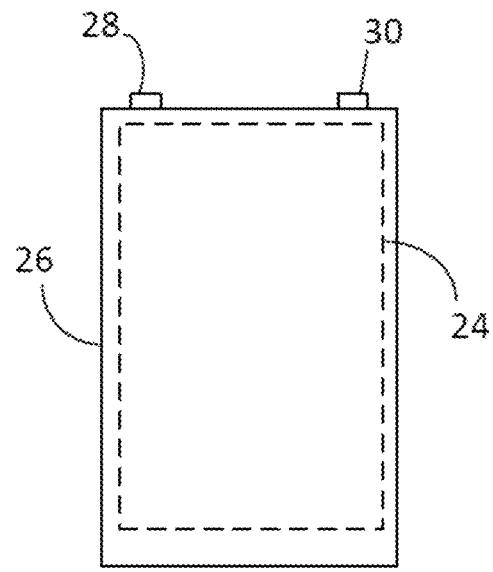
FIG. 4 illustrates a battery including an electrode assembly constructed according to FIG. 3.

A battery can include the electrode assembly 24 positioned in a case 26 as shown in FIG. 4. Although not illustrated in FIG. 4, the one or more negative electrodes in the electrode assembly can be in electrical communication with a first terminal 28 and the one or more negative electrodes in the electrode assembly can be in electrical communication with a second terminal 30. The battery can optionally include one or more insulators (not shown) positioned so as to prevent shorting in the battery.

The case can contain an electrolyte (not shown) that is positioned so as to activate the electrode assembly. For instance, the electrolyte can be positioned between the negative electrodes and the positive electrodes. Suitable electrolytes include, but are not limited to, liquid electrolytes, solid electrolytes, and gel electrolytes. Examples electrolytes include one or more salts dissolved in a solvent. Suitable solvents include, but are not limited to, organic solvents and combinations of organic solvents. Examples of suitable organic solvents include, but are not limited to, cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), dialkyl carbonates such as diglyme, triglyme, tetraglyme, 1,2-dimethoxyethane (DME), methyl propyl carbonate, ethyl propyl carbonate, aliphatic carboxylate esters such as methyl formate, methyl acetate and ethyl propionate, gamma-lactones such as γ-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters.

Suitable salts for use with the electrolyte include, but are not limited to, $NaPF_6$, $NaClO_4$, NaTFSI, NaFSI and mixtures thereof.

The ability of the active material in the positive electrode to intercalate and/or deintercalate charge carriers increases the gravimetric capacity and/or gravimetric energy density of the positive active material.

The battery can be included in a system that includes electronics in electrical communication with the battery. The electronics can monitor and control discharge and/or charging of the battery. For instance, the electronics can stop discharge of the battery in response to the voltage of the battery falling below a voltage threshold.

Suitable electronics include, but are not limited to, firmware, hardware and software or a combination thereof. Examples of suitable electronics include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the electronics include one or more memories and one or more processing units such as a CPU. The one or more memories can include instructions to be executed by the processing unit during performance of the control and monitoring functions.

EXAMPLES

Example 1

Synthesis. $KVPO_4F$ was prepared using a solid-state method. First, $VPO_4$ was synthesized by reacting $NH_4H_2PO_4$ (11.5 g, 98%, Alfa Aesar), $V_2O_3$ (9.05 g, >99.6%, Sigma-Aldrich), and carbon black (1.2 g, Super P, Timcal). The precursors were mixed using wet ball-milling in acetone for 12 h and dried overnight at 100° C. The mixture was pelletized and then sintered at 750° C. for 4 h under continuous Ar flow. Stoichiometric amounts of KF (99.9%, Sigma-Aldrich) and $VPO_4$ were homogeneously mixed using a planetary ball mill (Retsch PM200) at 300 rpm for 4 h. The mixture was pelletized and sintered at 650° C. for 8 h with continuous Ar flow.

$NaVPO_4F$ was obtained by electrochemical Na/K exchange. For the electrochemical Na/K exchange, a $KVPO_4F$/K cell was prepared and K was extracted from the $KVPO_4F$. The resulting $VPO_4F$ was then discharged in a $VPO_4F$/Na cell, to obtain $NaVPO_4F$ with KTiOPO4 type structure.

Structure analysis. The structure of each sample was analyzed using X-ray diffraction (XRD; Rigaku Miniflex 600) with Cu Kα radiation, and the structural parameters were determined using the Rietveld method and Highscore Plus software. Scanning electron microscopy (SEM) images were collected on a Zeiss Gemini Ultra-55 Analytical Field Emission SEM.

Electrochemical measurements. Electrodes were prepared by mixing the active material (70 wt %), Super P carbon black (Timcal, 20 wt %), and polytetrafluoroethylene (PTFE; DuPont, 10 wt %) binder in an Ar-filled glovebox. Test cells were assembled into 2032 coin-cells in a glovebox with a two-electrode configuration using K, Na, and Li metal counter electrodes. A grade GF/F separator (Whatman, USA) and an electrolyte of 0.7 M $KPF_6$ in ethylene carbonate/diethyl carbonate (EC/DEC; anhydrous, 1:1 volume ratio), 1 M $NaPF_6$ in EC/DEC, or 1 M $LiPF_6$ in EC/DEC were used. The electrochemical tests were performed on a battery testing station (Arbin Instruments) using cathode films with a loading density of ~4.9 mg $cm^{-2}$.

Computational methods. Density functional theory (DFT) calculations were performed using the projector augmented-wave (PAW) approach, as implemented in the Vienna ab initio simulation package (VASP). The Perdew-Burke-Ernzerhof (PBE) exchange-correlation functional was adopted for all the calculations. To compensate for the self-interaction errors of the generalized gradient approximation (GGA), the Hubbard U correction was employed. The U value for vanadium was set to 5.0 eV, as used in previous studies of KVPO$_4$F. A gamma-centered 2×3×2 k-point grid was used, and the planewave cutoff energy was set to 520 eV. The structures of NaVPO$_4$F and LiVPO$_4$F were constructed by substituting K in KVPO$_4$F with the corresponding alkali elements. Because the alkali-ion sites are partially occupied in the original structural data, all the K-vacancy orderings within a unit cell (8 formula units) were generated, and the 50 configurations with the lowest electrostatic energies were selected using the Pymatgen package. The most stable configurations were then determined from the DFT calculations. The average voltage was calculated using the following equation:

$$V = -\frac{E(AVPO_4F) - E(VPO_4F) - E(A)}{F},$$

where E(AVPO$_4$F), E(VPO$_4$F), and E(A) are the calculated energies of AVPO$_4$F, VPO$_4$F, and metallic A (K, Na, or Li), respectively, and F is the Faraday constant.

The migration barriers for alkali ions in AVPO$_4$F were calculated using the climbing image nudged elastic band (CI-NEB) method. For these calculations, 1×2×1 supercells containing 16 formula units with a gamma-centered 1×1×2 k-point grid were used. The standard GGA functional was employed as it is difficult to achieve convergence for NEB calculations using GGA+U because of possible metastability of the electronic states along the migration path.

Figure 5A:
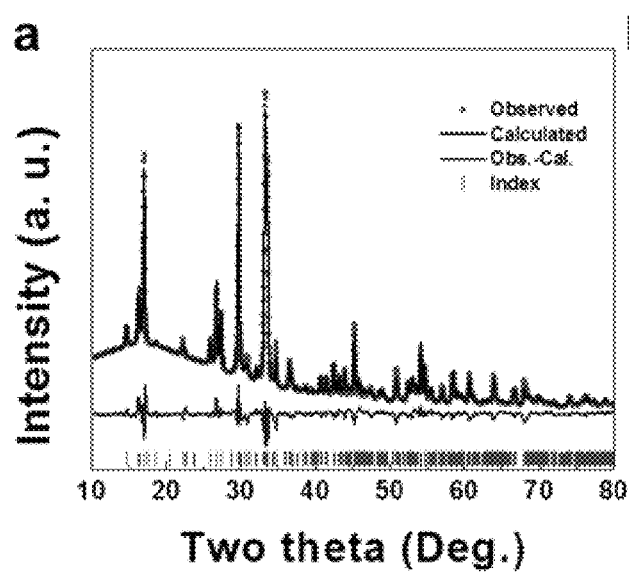
FIG. 5A-B shows the structure and morphology of $KVPO_4F$. (A) shows a Rietveld-refined XRD profile obtained from as-prepared $KVPO_4F$ using the $Pna2_1$ space group which provides a good fit ($R_{wp}$=5.5). (B) is an SEM image of $KVPO_4F$.
Figure 5B:
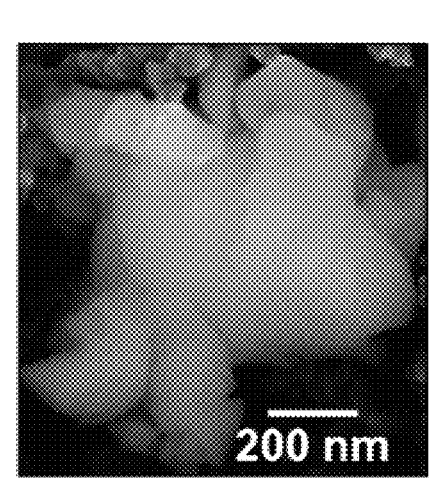
Figure 6A:
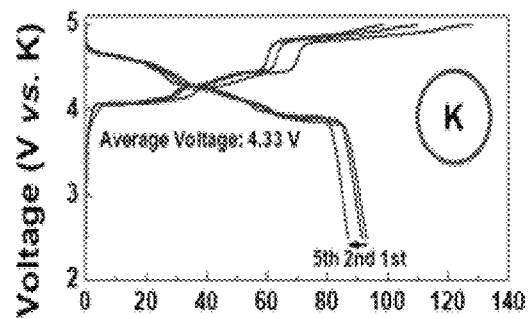
FIG. 6A-E shows electrochemical measurements of $VPO_4F$ in K, Na, and Li cells. Charge/discharge profiles of $VPO_4F$ in (A) K, (B) Na, and (C) Li cells. (D) Cycling stability of $VPO_4F$ in K, Na, and Li cells. (E) Average voltage of $VPO_4F$ vs. standard hydrogen electrode (SHE).
Figure 6B:
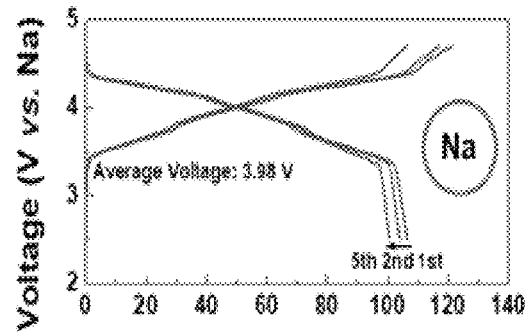

Material characterization. FIG. 5A presents an XRD pattern and refinement results for KVPO$_4$F. The refinement of the as-prepared KVPO$_4$F with Pna2$_1$ space group yields lattice parameters of a=12.8174, b=6.3955, and c=10.6000, which agrees well with previous results in the literature. FIG. 5B presents a SEM image of KVPO$_4$F. To obtain a better SEM image without effects of charging, the KVPO$_4$F particles were mixed with conductive carbon. The primary particle size of KVPO$_4$F is estimated to be ~100-200 nm. The small particles at the top of FIG. 6B are the carbon additive.

Figure 6C:
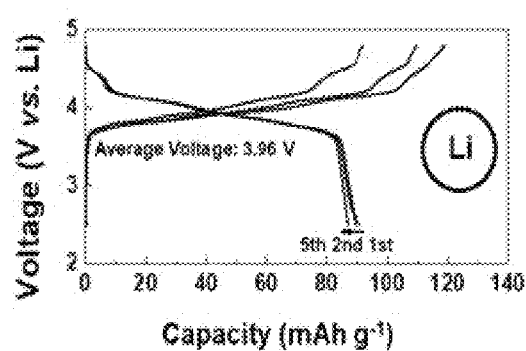
Figure 6D:
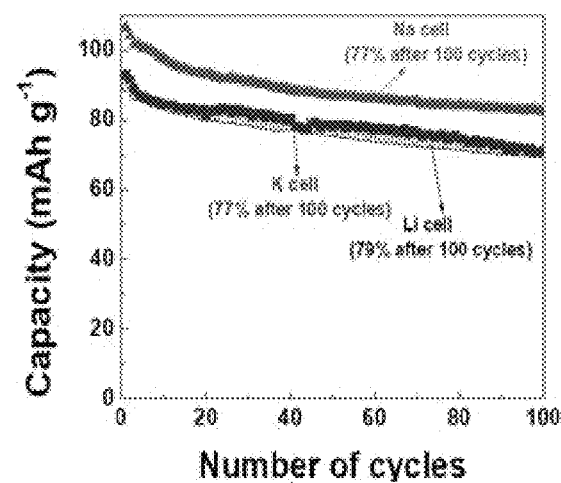
Figure 6E:
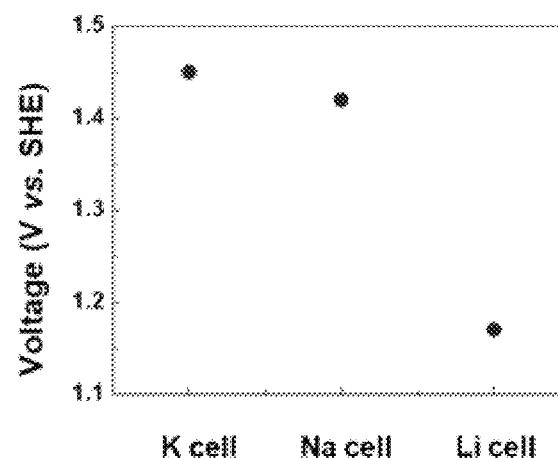

Electrochemical cycling of VPO$_4$F in K, Na, and Li cells. FIG. 6A-C present the electrochemical charge and discharge profiles of VPO$_4$F electrodes in K, Na, and Li cells, respectively. Preceding the electrochemical measurements in Na and Li cells, the KVPO$_4$F cathode was fully charged to 5.0 V (vs. K/K$^+$) in a K cell, and the charged VPO$_4$F cathode was reassembled in Na and Li cells. The specific capacity is calculated based on the weight of the KVPO$_4$F cathode. In the K cells, the VPO$_4$F cathode delivers capacities of 129 and 93 mAh g$^{-1}$ during the first charge and discharge, respectively, with an average voltage of ~4.33 V vs. K/K$^+$ (FIG. 6A). The VPO$_4$F cathode exhibits a capacity of 122 mAh g$^{-1}$ for the first charge and 106 mAh g$^{-1}$ for the first discharge in Na cells (FIG. 6B). An average voltage of ~3.98 V (vs. Na/Na$^+$) is observed in the Na cells. In the Li cells, the VPO$_4$F cathode achieves a capacity of ~119 mAh g$^{-1}$ and ~91 mAh g$^{-1}$ for the first charge and discharge, respectively, and average voltage of ~3.96 V (vs. Li/Li$^+$), as shown in FIG. 6C. The charge and discharge voltage profiles of VPO$_4$F are unchanged during the electrochemical cycling in each cell, indicating reversible alkali-ion de/intercalation. This is confirmed by the cycling stability shown in FIG. 6D. In K, Na, and Li cells, the VPO$_4$F cathode maintains respectively ~77%, ~77%, and ~79% of the initial discharge capacity after 100 cycles. The average voltage of the VPO$_4$F cathode in K, Na, and Li cells in FIG. 6E, are contrasted with the average voltage of each cell vs. the standard hydrogen electrode (SHE) potential in propylene carbonate solvent. The values in FIG. 6E were obtained by adding the SHE potential of M/M$^+$ (M=Li, Na, and K) in carbonate solution to the average voltage of the cathode (vs. M/M$^+$). To eliminate the effect of polarization, the average of the charge and discharge voltages were plotted. Insertion of K, Na, and Li in VPO$_4$F occurs at 1.45, 1.42, and 1.17 V (vs. SHE), respectively, indicating that the average voltage of VPO$_4$F decreases with decreasing intercalating ion size from K$^+$ to Li$^+$. As the charged state is the same in all the cases (VPO$_4$F), the electrochemical voltage is determined by the energetics of the discharged state alone (K$_x$VPO$_4$F vs. Na$_x$VPO$_4$F vs. Li$_x$VPO$_4$F). The large cavities for alkali ions in the VPO$_4$F framework are expected to preferentially intercalate K and Na ions, forming more stable compounds and thus leading to a higher voltage than for Li intercalation. To understand in more detail how each ion intercalates, the calculated crystal structures of KVPO$_4$F, NaVPO$_4$F, and LiVPO$_4$F were compared. As presented in FIG. 12, the K and Na ions are located in the same sites, K1 and K2, where they are coordinated by six O$^{2-}$ ions and two F$^-$ ions. In contrast, the Li ions prefer a site that has planar coordination with two O$^{2-}$ ions and two F$^-$ ions (Li1), and a site that has planar coordination with four O$^{2-}$ ions (Li2) (see FIG. 13). The relative decrease of Li-insertion voltage compared to K-insertion is likely due to this unusual coordination of Li which usually prefers a tetrahedral or octahedral anion geometry. The calculated average voltages are 4.34 V (vs. K/K$^+$) for K intercalation, 3.88 V (vs. Na/Na$^+$) for Na intercalation, and 3.94 V (vs. Li/Li$^+$) for Li intercalation. These values translate to 1.46, 1.32, and 1.15 V vs. SHE, respectively, which is consistent with the experimental trend that the average voltage decreases with decreasing intercalating ion size.

Figure 7A:
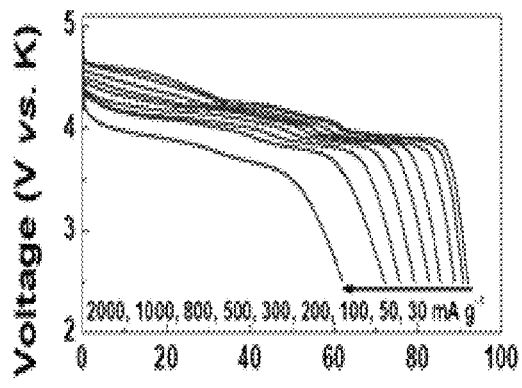
FIG. 7A-E shows discharge rate capability of $VPO_4F$ in K, Na, and Li cells. Discharge profiles of $VPO_4F$ in (A) K, (B) Na, and (C) Li cells at different current rates (30-2,000 mA $g^{-1}$). (D) Discharge capacity of $VPO_4F$ at different current rates. (E) Normalized capacity of $VPO_4F$ at different current rates.
Figure 7B:
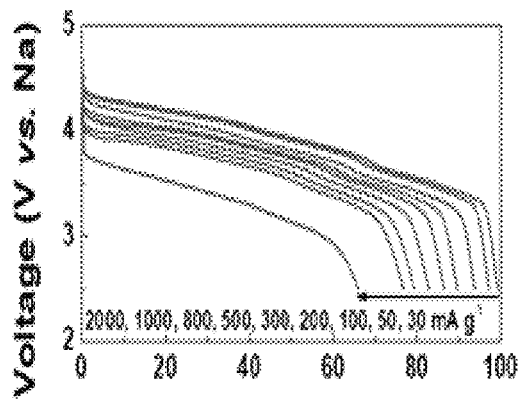
Figure 7C:
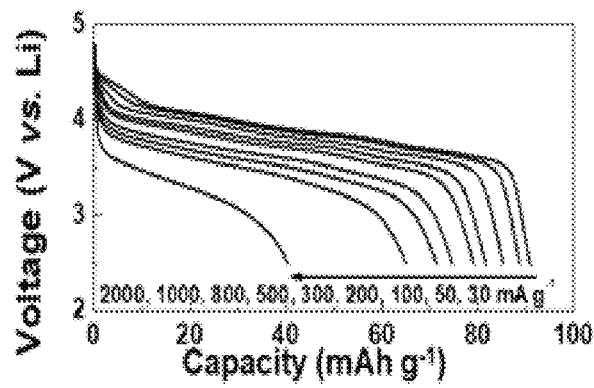
Figure 7D:
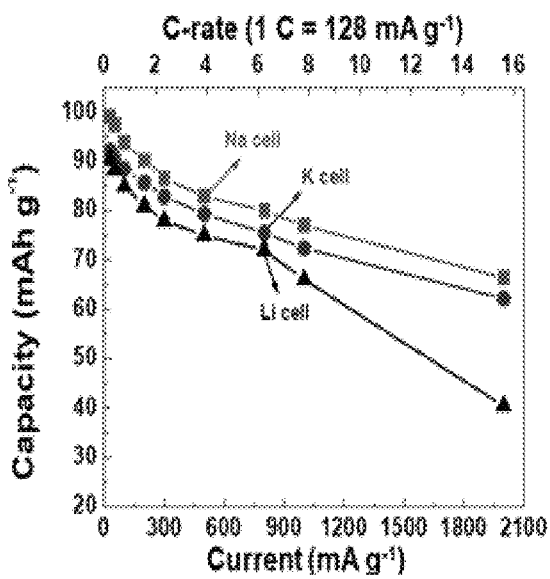
Figure 7E:
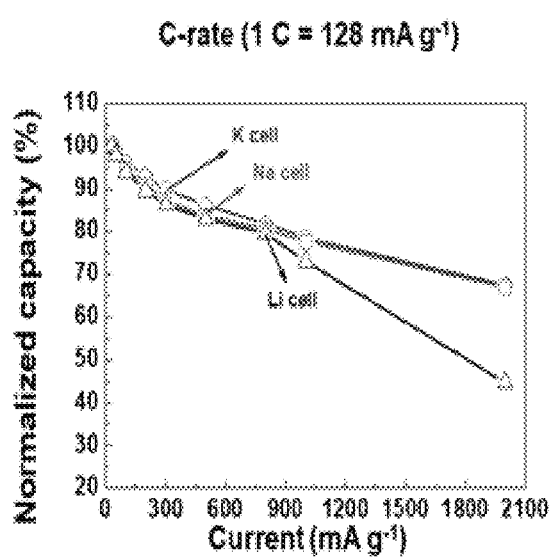

Rate capability. The rate capability of VPO$_4$F in K, Na, and Li cells in discharge was tested by charging at 30 mA g$^{-1}$ and discharging at various current rates ranging from 30 to 2000 mA g$^{-1}$. The results are shown in FIG. 7A-C. In K cells, VPO$_4$F cathode delivers 92.14, 90.65, 88.5, 85.7, 82.8, 79.4, 75.5, 72.4, and 62.2 mAh g$^{-1}$ at 30, 50, 100, 200, 500, 800, 1000, and 2000 mA g$^{-1}$, respectively (FIG. 7A). In Na cells, VPO$_4$F cathode provides 99.1, 97.5, 93.8, 90.3, 86.6, 82.9, 80, 77, and 66.4 mAh g$^{-1}$ at 30, 50, 100, 200, 500, 800, 1000, 2000 mA g$^{-12}$, respectively, as observed in FIG. 7B. Capacities of 90.4, 88.4, 85, 81, 78, 75, 72, 66, and 40.4 mAh g$^{-12}$ are observed for the VPO$_4$F cathode in Li cells at 30, 50, 100, 200, 500, 800, 1000, 2000 mA g$^{-1}$, respectively (FIG. 7C). FIG. 7d-e compares the capacity retention of VPO$_4$F with increasing current in K, Na, and Li cells. At a high current of 2000 mA g$^{-1}$ (~15C, where 1C=128 mA g$^{-1}$), VPO$_4$F retains 67.5% (K), 67% (Na), and 44.69% (Li) of its low-rate capacity. Interestingly, once the current density is higher than 800 mA g$^{-1}$ (6.25C), worse rate capability is observed for Li intercalation than for Na and K despite its smaller ionic radius. These results indicate that Li migration in VPO$_4$F is more difficult than for K and Na.

K, Na, and Li migration barriers in VPO$_4$F cathode. FIG. 8 shows the ab-initio calculated K-ion migration barriers of three possible paths in the KVPO$_4$F structure. Each path starts and ends in an equivalent site so that it can percolate through the extended crystal. In a pristine KVPO$_4$F structure (without vacancies), K ions are located at two distinct sites, namely K1 and K2. The K ion at the K1 site shares two F ions with two VO$_4$F$_2$ octahedra, whereas at the K2 site, K shares two F ions with a single VO$_4$F$_2$ octahedron. Interestingly, when a vacancy is formed in the KVPO$_4$F structure, the K ion adjacent to the vacancy spontaneously moves to a new site (K3), which is located between the K1 and K2 sites (FIG. 14). This 'spontaneous K3 migration' participates in K-ion diffusion along path3, as discussed later. As there is spontaneous K ion migration into the new K3 site in both initial and final structures and they have the equivalent site occupancy in the K migration calculations, the energy of these structures are the same although the K1 and K2 site energies are different (FIG. 8).

Figure 8A:
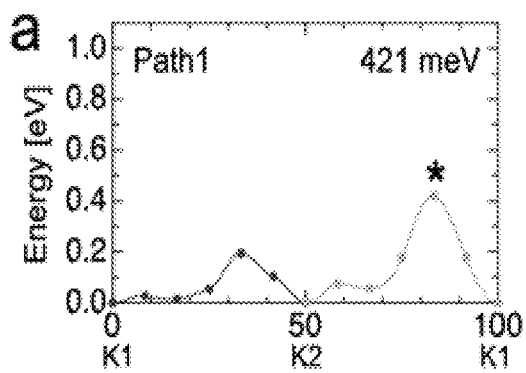
FIG. 8A-F shows K-ion migration barriers and paths in $KVPO_4F$. (A) K-ion migration barrier and (B) K migration path1; (C) K-ion migration barrier and (D) K migration path2; and (E) K-ion migration barrier and (F) K migration path3. The asterisks represent transition states. The value of the migration barriers is shown at the top right corner of each plot in (A), (C), and (E). The trajectories correspond to the migration barriers. K1, K2, and K3 denote symmetrically distinct K sites, and the black dashed lines represent cross sections of the hexagonal voids. The K sites along path3 are labeled with A-E for clarity.
Figure 8B:
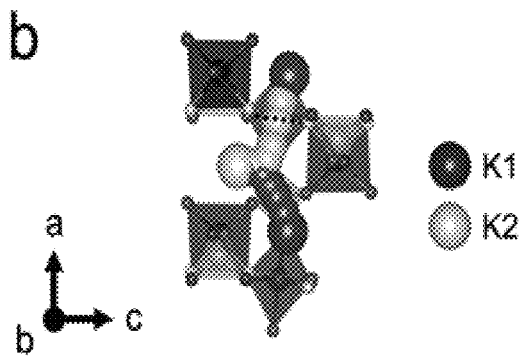
Figure 8C:
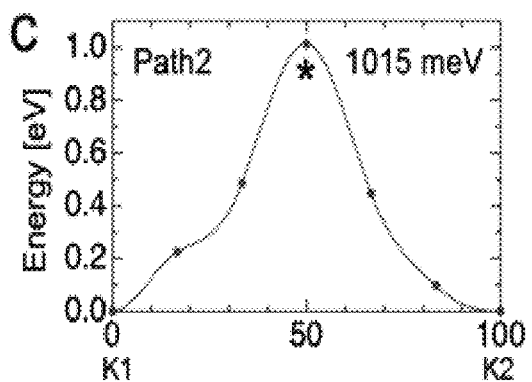
Figure 8D:
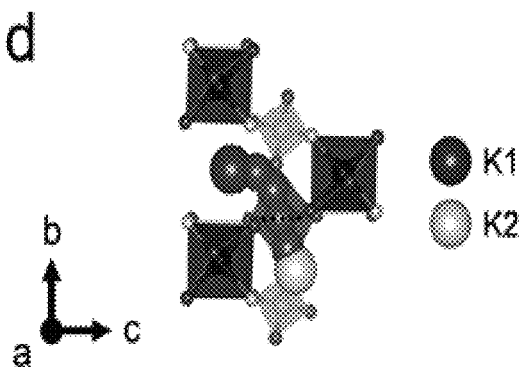
Figure 15A:
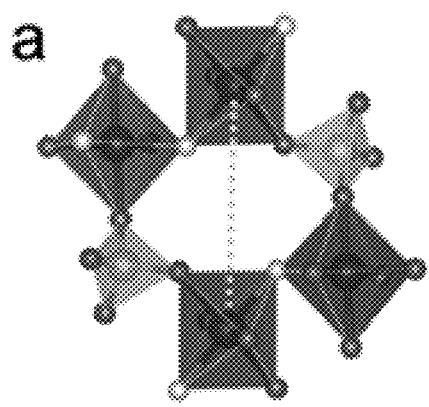
FIG. 15A-B shows two types of hexagonal voids in VPO$_4$F framework. (A) Void1 is composed of four VPO$_4$F$_2$ octahedra and two PO$_4$ tetrahedra. (B) Void2 is composed of three VPO$_4$F$_2$ octahedra and three PO$_4$ tetrahedra. The dashed lines denote the shortest V-V or V-P distance.
Figure 15B:
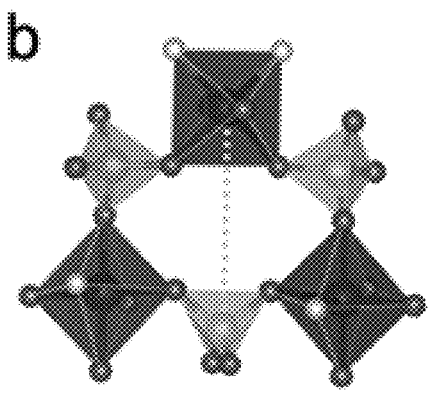

FIG. 8A shows the migration energy for K along path1 which goes between K1 site and through a K2 site, illustrated in FIG. 8B. This path (path1) involves two hops. In the first hop, the K ion at the K1 site hops to a K2 site. In the second hop, the K ion moves from this K2 to another K1 site. The overall diffusion direction of this path is along the a-axis and has a migration barrier of 421 meV. Path 2 is an alternative pathway between two K1 sites through K2, but this time along the bc diagonal direction. The energy and visualization is shown in FIG. 8C-D for half of the path as the second half is symmetric. The very high migration energy along this path (>1 eV) as compared to path1 is related to the hexagonal voids K-ion has to pass through. At the transition states of path1 and path2 (asterisks in FIGS. 8A and 8C, respectively), the K ion passes through hexagonal void1 and void2, respectively. The two hexagonal voids are shown in FIG. 15. Four $VPO_4F_2$ octahedra and two $PO_4$ tetrahedra bound hexagonal void1 while hexagonal void2 is composed of three $VPO_4F_2$ octahedra and three $PO_4$ tetrahedra. Because the K ion gets close to a V ion in these voids, they constitute the bottlenecks for the two K-migration paths. For path2, the distance between the hopping K ion and the nearest V ion at the hexagonal void is only 3.12 Å, which is shorter than that for path1 (3.36 Å). This increased electrostatic interaction likely contributes to the higher K migration barrier along path2 than along path1.

Figure 8E:
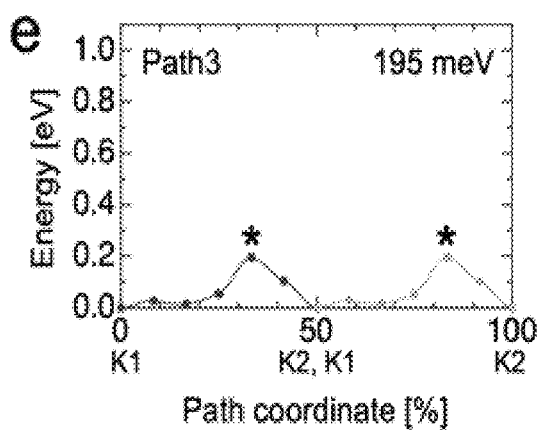
Figure 8F:
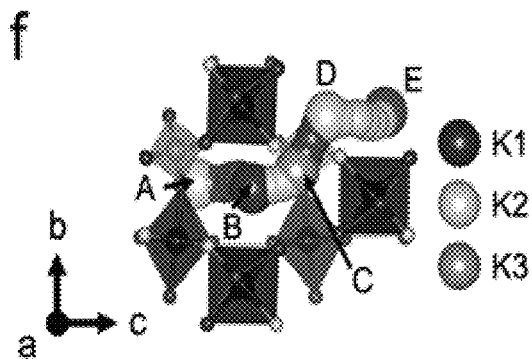
Figure 9A:
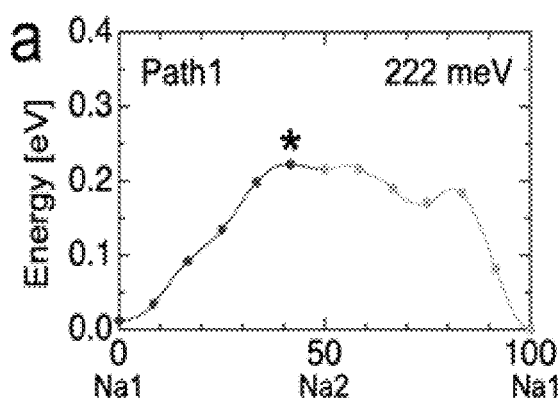
FIG. 9A-D shows Na-ion migration barriers and migration paths in NaVPO$_4$F. (A) Na-ion migration barrier and (B) Na migration path1; (C) Na-ion migration barrier and (D) Na migration path2. The asterisks represent transition states. The value of the migration barriers is shown at the top right corner of each plot in (A) and (C). The shaded trajectories correspond to the migration barriers of the same shade. Na1 and Na2 denote symmetrically distinct Na sites, and the black dashed lines represent cross sections of the hexagonal voids.
Figure 9B:
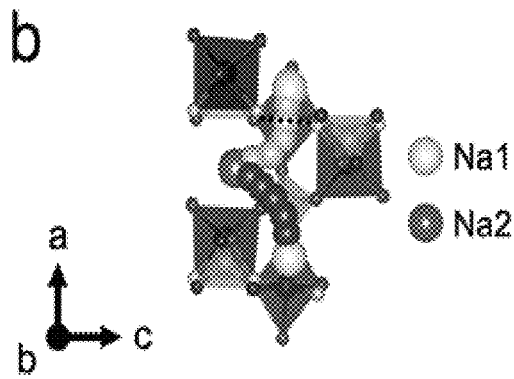
Figure 9C:
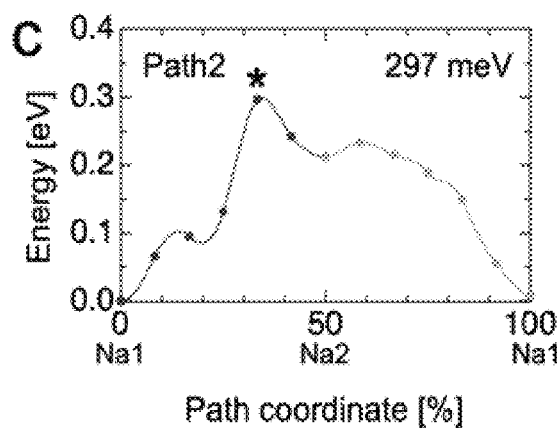
Figure 9D:
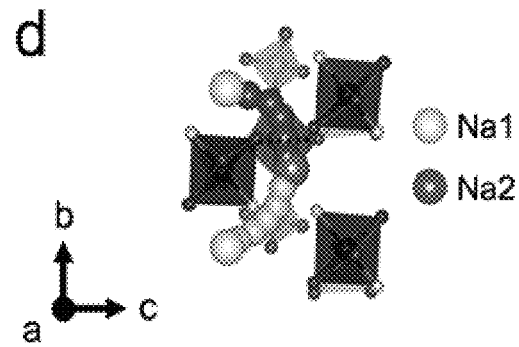
Figure 16A:
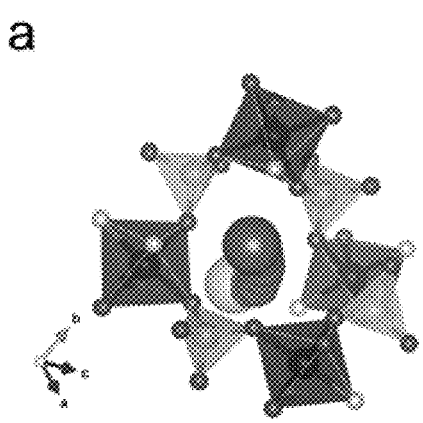
FIG. 16A-B shows large voids composed of (A) four VO$_4$F$_2$ octahedra and four PO$_4$ tetrahedra and (B) five VO$_4$F$_2$ octahedra and three PO$_4$ tetrahedra. The K ion in KVPO$_4$F passes through these large voids along path3.
Figure 16B:
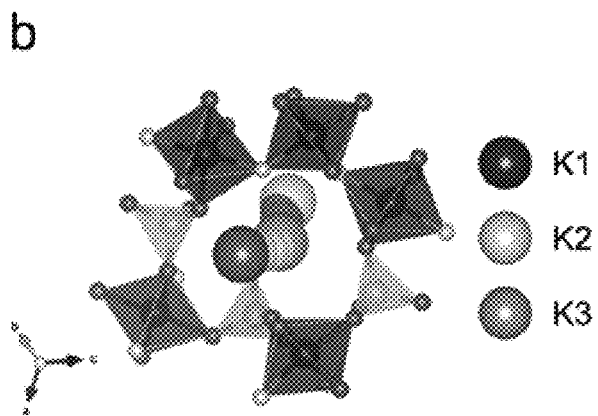
Figure 17:
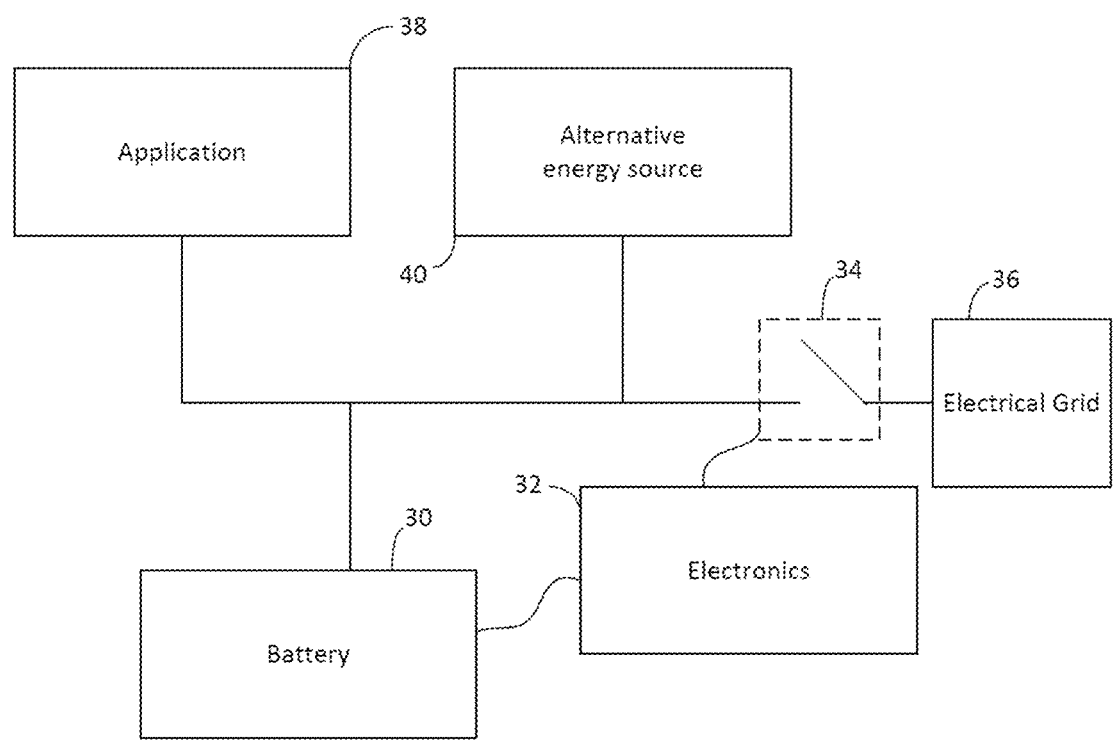
FIG. 17 is a block diagram of a grid that includes a battery according to the disclosure.

FIGS. 8E and 8F show the K migration barrier and corresponding trajectory of path3. Each K site in FIG. 8F is labeled for clarity, namely B and E are K1-type sites, A and D are K2 sites, and C is a K3 site. Path3 consists of two hops, each of which involves concerted migration. The first hop (0% of the path coordinate in FIG. 8E) starts with site C (K3) vacant because the adjacent B (K1) and D (K2) sites are occupied. The first hop migrates the K ion from site B to A, forming a vacancy at B. At the same time, the K ion at site D spontaneously moves to site C (K3) because the vacancy formed at the adjacent B site has lowered the energy of that site. The second hop migrates the K ion at site E to the vacant D site, while the K ion at site C is simultaneously pushed to site B because of the repulsion between the two K ions. This concerted migration enables K ions to move along the c-axis with a migration barrier of 195 meV. The reason the path3 has a low migration barrier is that the K ion passes through larger cavities, composed of eight polyhedra (FIG. 16), without traversing the hexagonal voids. The shortest K-V distance in the transition state along path3 is 3.74 Å, which is much longer than that along path1 (3.36 Å) or path2 (3.12 Å). Because the migration barrier of path2 is too high for K ions to migrate, diffusion of K is limited to migration along path1 and path3.

FIG. 9 investigates the migration of Na in $VPO_4F$. Similar to the pristine $KVPO_4F$ structure, there are two sites (Na1 and Na2) in $NaVPO_4F$, with the Na1 and Na2 sites corresponding to the K1 and K2 sites, respectively. However, in the $NaVPO_4F$ structure, there is no locally stable K3 site and corresponding concerted migration, but path2 passes through the local K3 environment. It is thought that this is because Na ions are under-coordinated in the K3 site, which is even larger than the K1 and K2 sites. FIGS. 9A and 9B show the Na migration barrier and corresponding trajectory for path1. For path1, the Na ion at the Na1 site moves to the Na2 site in the first hop. In the second hop, the Na ion migrates from the Na2 to the Na1 site through the hexagonal void1 (FIG. 15A), which is represented by a black dashed line. The overall migration direction of path1 is along the a-axis with a barrier of 222 meV. Along path2, the Na ion migrates the Na1 to Na2 through the hexagonal void2 (FIG. 15B), which is represented as a black dashed line in FIG. 5D, followed by another hop back to a Na1 position. The overall migration direction of path2 is along the b-axis, and the migration barrier is 297 meV. Along these paths, the energy at the Na2 site (50% of the path coordinate) is approximately 200-meV higher than at the Na1 site (0% or 100% of the path coordinate), which is likely attributable to the shorter Na-V distance at the Na2 site (3.18 Å) compared with that at the Na1 site (3.44 Å). Along path1, the Na ion passes through the hexagonal void1 where the shortest Na-V distance is 3.30 Å, which is larger than that at the Na2 site (3.18 Å). Thus, Na migration through the hexagonal void1 does not result in a significant Na migration barrier and most of the barrier is accounted for by the Na1-Na2 site energy difference. Along path2, however, the energy is highest when the Na ion traverses the hexagonal void2 where Na is only 3.03 Å away from a V ion.

For comparison, FIG. 10 shows the Li-ion migration barriers for three possible migration paths in $LiVPO_4F$ (path1, path2, and path3). The two Li sites in $LiVPO_4F$ are different than the K or Na sites: Li ions have planar coordination with $2O_2^-$ and $2F^-$ (Li1) shown in FIG. 13A or with $4O^{2-}$ (Li2) (see FIG. 13B). The K site coordinated by $7O^{2-}$ ions and $2F^-$ ions is likely too large for Li to occupy. In $LiVPO_4F$, the Li1 site is about 240 meV higher in energy than the Li2 site. There are several reasons for this energy difference. The Li1 site has more V neighbors than the Li2 site. Whereas the Li2 site is coordinated by $4O^{2-}$ which screen the electrostatic repulsion with the surrounding V ions, the Li1 site is coordinated by $2O^{2-}$ and $2F^-$ creating less effective screening of the interaction with V.

Figure 10A:
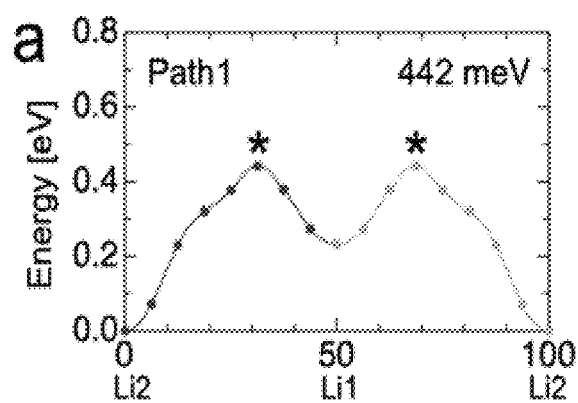
FIG. 10A-F shows Li-ion migration barriers and migration paths in LiVPO4F. (A) Li-ion migration barrier and (B) Li migration path1; (C) Li-ion migration barrier and (D) Li migration path2; and (E) Li-ion migration barrier and (F) Li migration path3. The asterisks represent transition states. The value of the migration barriers is shown at the top right corner of each plot in (A), (C), and (E). The shaded trajectories correspond to the migration barriers of the same shade. Li1 and Li2 denote symmetrically distinct Li sites.
Figure 10B:
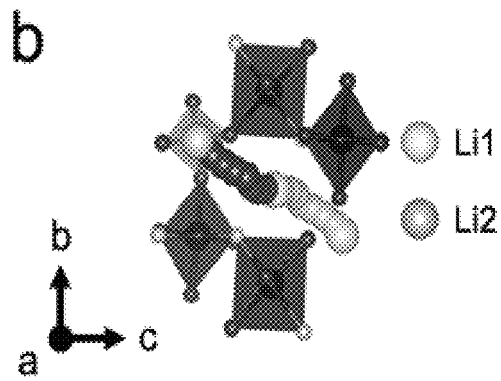
Figure 10C:
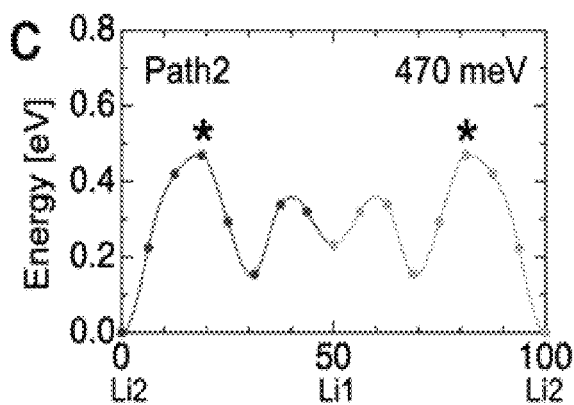
Figure 10D:
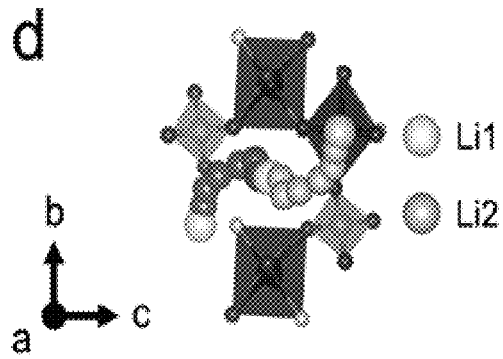
Figure 10E:
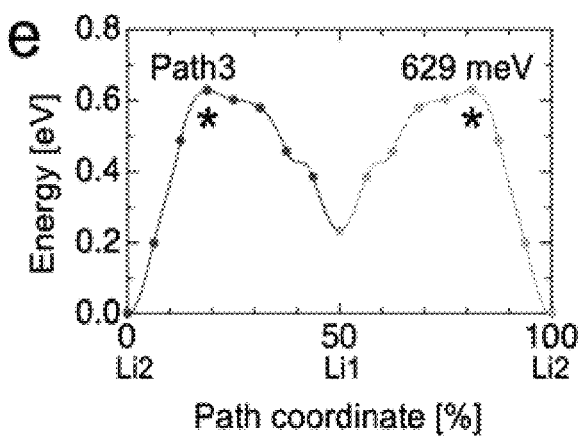
Figure 10F:
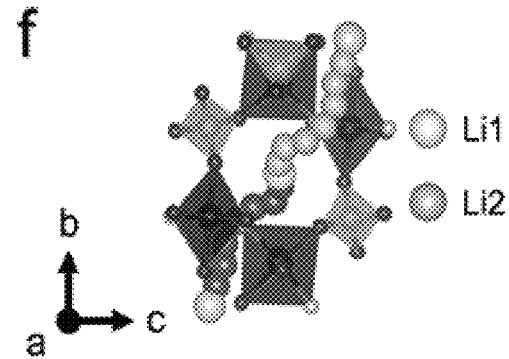

FIG. 10A-B show the Li migration barrier and trajectory along path1. A Li ion at a Li2 site first moves through a Li1 site into another Li2 site. This trajectory along the bc diagonal direction has a migration barrier of 442 meV. FIG. 10C-D and FIG. 10E-F show the migration energy and corresponding trajectory of path2 and path3, respectively. Similar to path1, the Li ion moves from Li2 to Li1 and then migrates to another Li2 site along path2 and path3. The migration barriers of path2 and path3 are 470 and 629 meV, respectively. At the transition state for each path, the hopping Li ion is coordinated by only two anions, whereas it is coordinated by four anions at the Li1 and Li2 sites. The fact that $Li^+$ has to squeeze through this anion-anion dumbbell where it is highly under-coordinated creates a high Li migration barrier. Of the three paths, the migration barrier of path1 is the lowest because the shortest Li-V distance (3.35 Å) at the transition state is longer than that for path2 (2.68 Å) or path3 (2.80 Å). Path3 has a higher migration barrier than path2, although the shortest Li-V distance for path3 is longer than that for path2. This result is likely attributed to the anion species, encountered along the trajectory. At the transition state, the hopping Li ion is coordinated by $2O^{2-}$ ions along path2 but by $1O^{2-}$ ion and $1F^-$ ion along path3. Moreover, the second shortest Li-V distance for path3 (3.51 Å) is shorter than that for path2 (4.40 Å). These factors may contribute to the higher migration barrier for path3. The migration barriers in $LiVPO_4F$ are relatively high compared with those in KVPO$_4$F and NaVPO$_4$F, which is likely responsible for the inferior rate capability of LiVPO$_4$F at 2000 mA g$^{-1}$ observed in FIG. 7D-E.

Figure 11:
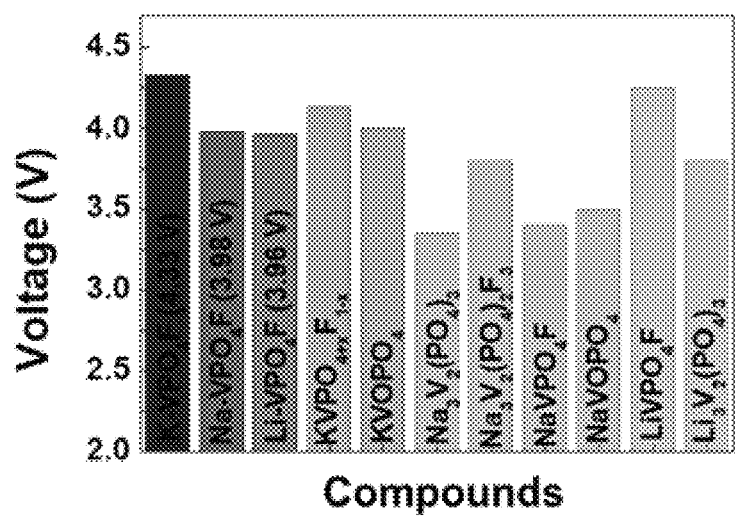
FIG. 11 shows average voltage of VPO4F in K, Na, and Li cells and comparison with V-based polyanion cathodes from the literature.

In FIG. 11, the average voltage of the VPO$_4$F cathode in K, Na, and Li cells compared with that of other vanadium-redox-based polyanion cathode materials is presented. The working voltage of K—VPO$_4$F is the highest for all reported K cathodes and higher than KVPO$_{4+x}$F$_{1-x}$ and KVOPO$_4$. In the Na cell, VPO$_4$F provides a high voltage of 3.98 V (vs. Na), which is the highest ever reported voltage in a vanadium-based polyanion cathode for NIBs, including Na$_3$V$_2$(PO$_4$)$_3$, Na$_3$V$_2$(PO$_4$)$_2$F$_3$, NaVPO$_4$F, and NaVOPO$_4$. The voltage of 3.96 V (vs. Li) in a VPO$_4$F/Li cell is comparable to that of LiVPO$_4$F[36] and Li$_3$V$_2$(PO$_4$)$_3$[37]. Given the higher standard redox potential of Na/Na$^+$ than Li/Li$^+$, it is interesting that VPO$_4$F has a higher voltage in the Na cell than in the Li cell. The lower voltage for Li likely originates from the relatively small ionic size of Li$^+$ compared to Na$^+$ or K$^+$, which makes it less stable in the large Na site of the VPO$_4$F framework. The research suggests that the relative size of the intercalating ion species and the cavity plays a role in determining the voltage of the alkali ion intercalation.

The invention claimed is:

1. A sodium-ion battery, comprising:
   an electrode having a sodium intercalating crystalline active structure, wherein the structure has the same crystalline structure as a KTiOPO$_4$.

2. The battery of claim 1, wherein the sodium intercalating crystalline active structure has an orthorhombic crystal structure.

3. The battery of claim 1, wherein the sodium intercalating crystalline active structure has vanadium in sites that are octahedrally coordinated by oxygen.

4. The battery of claim 1, wherein the sodium intercalating crystalline active structure has tetrahedral phosphate sites.

5. The battery of claim 1, wherein the sodium intercalating crystalline active structure comprises a sodium with an anion coordination number of 8.

6. The battery of claim 1, wherein the sodium intercalating crystalline active structure comprises a sodium linked to other atoms through an oxygen intermediate.

7. The battery of claim 1, wherein the electrode comprises NaVPO$_4$F.

8. The battery of claim 1, wherein the electrode is a positive electrode or a cathode.

9. The battery of claim 7, wherein the sodium intercalating crystalline active structure comprises multiple corner-sharing octahedra.

10. The battery of claim 9, wherein at least one of the anions is an oxygen anion (O$^{2-}$).

11. The battery of claim 9, wherein all of the anions are oxygen.

12. The battery of claim 8, wherein the positive electrode or cathode exhibits a capacity of 122 mAh g$^{-1}$ for a first charge and 106 mAh g$^{-1}$ for a first discharge.

13. The battery of claim 8, wherein the positive electrode or cathode has a voltage of about 3.8 to 4.1 V.

14. A sodium-ion battery or sodium metal battery, comprising:
   (a) an anode having an anode active material;
   (b) a cathode having a sodium intercalating crystalline active structure, wherein the structure has the same crystalline structure as a KTiOPO$_4$; and
   (c) a separator disposed between said anode and said cathode.

15. The battery of claim 14, wherein the sodium intercalating crystalline active structure has an orthorhombic crystal structure.

16. The battery of claim 14, wherein the sodium intercalating crystalline active structure has vanadium in sites that are octahedrally coordinated by oxygen.

17. The battery of claim 14, wherein the sodium intercalating crystalline active structure has tetrahedral phosphate sites.

18. The battery of claim 14, wherein the sodium intercalating crystalline active structure comprises a sodium with an anion coordination number of 8.

19. The battery of claim 14, wherein the sodium intercalating crystalline active structure comprises a sodium linked to other atoms through an oxygen intermediate.

20. The battery of claim 14, wherein the sodium intercalating crystalline active structure comprises NaVPO$_4$F.

21. The battery of claim 14, wherein the positive electrode or cathode exhibits a capacity of 122 mAh g$^{-1}$ for a first charge and 106 mAh g$^{-1}$ for a first discharge.

22. The battery of claim 14, wherein the positive electrode or cathode has an average voltage of ~3.98 V.

23. A system, comprising:
   a sodium-ion battery of claim 1; and
   electronics for controlling the discharge of the battery.

* * * * *